United States Patent [19]

Tanaka et al.

[11] Patent Number: 4,853,519
[45] Date of Patent: Aug. 1, 1989

[54] HEATING APPARATUS FOR HEATING IN A PLURALITY OF HEATING MODES

[75] Inventors: Seiji Tanaka, Yamato-Koriyama; Hideshi Nakagawa, Osaka, both of Japan

[73] Assignee: Sharp Kabushiki Kaisha, Osaka, Japan

[21] Appl. No.: 167,101

[22] Filed: Mar. 11, 1988

[30] Foreign Application Priority Data

Aug. 1, 1987 [JP] Japan .................. 62-118495[U]

[51] Int. Cl.$^4$ ............................... H05B 1/02
[52] U.S. Cl. .................. 219/497; 219/494; 219/501; 219/508; 219/509; 307/117
[58] Field of Search ........... 219/494, 497, 491, 499, 219/501, 507, 508, 509, 441–443; 307/117; 236/46 R, 46 F

[56] References Cited

U.S. PATENT DOCUMENTS

| | | | |
|---|---|---|---|
| 4,330,702 | 5/1982 | Cheng | 219/442 |
| 4,478,181 | 10/1984 | Kikuchi et al. | 219/497 |
| 4,495,405 | 1/1985 | Foster | 219/497 |
| 4,564,749 | 1/1986 | Ishima | 219/501 |
| 4,567,353 | 1/1986 | Aiba | 219/497 |

Primary Examiner—M. H. Paschall
Attorney, Agent, or Firm—Birch, Stewart, Kolasch & Birch

[57] ABSTRACT

A heating apparatus that utilizes a heating member for heating a desired subject detects the temperature of the subject being heated. This apparatus further generates a plurality of preset reference set points, compares these reference signals with the detected temperature. An energizing control circuit controls the supply of electricity to the heating member in accordance with the comparison result. The apparatus retains the signal generated from the comparison result, and as a result of this signal, changes the reference set point to cause the apparatus to heat at a new temperature setting.

11 Claims, 2 Drawing Sheets

HEATING APPARATUS FOR HEATING IN A PLURALITY OF HEATING MODES

BACKGROUND OF THE INVENTION

The present invention relates to a heating apparatus used in a vacuum coffee maker, an electric pot for boiling water, and the like.

In a conventional heating apparatus for the electric pot and the like, provisions are provided for switching between the high temperature heating state corresponding to a boiling mode and the low temperature heating state corresponding to a warming mode. There are two ways to accomplish this operation. One way is to use two thermostats having different actuating temperature each other, and another way is to use a thermistor for detecting the temperature of a subject to be heated and a temperature control circuit for changing a setting temperature of the thermistor. The former way can achieve its objective more easily, but this method has its drawbacks in that the reliability of the product is lower due to its many mechanically moving parts. Also, the product's temperature hunting is larger and fine temperature control is extremely difficult to achieve. The latter way solves such drawbacks mentioned above, but this method has other problems in that the construction of the temperature control circuit is complicated, and the number of electronic components are required, which increases the cost and the difficulty of service.

SUMMARY OF THE INVENTION

It is an objective of the present invention to provide a heating apparatus having a simple structure which is inexpensive to manufacture, and permits stable operation and good serviceability.

The present invention relates to a heating apparatus comprising, a heating member for heating a desired subject, temperature detecting means for detecting the temperature of the subject being heated, reference set point generating means for changing and outputting a plurality of preset reference set points, comparison means for comparing an output signal of the temperature detecting means and the reference set point, energizing control means for controlling a supply of electricity to the heating member in accordance with the comparison result from the comparison means, and retaining means for holding the signal from the a change signal to the reference setpoint generating means commanding the change of the reference set a signal commanding the changeover of the reference set point in accordance with the output signal from the comparison means.

The temperature detecting means is preferably a thermistor having a negative characteristic.

The retaining means is preferably an R.S flip-flop circuit, in particular, a one-chip flip-flop IC.

Also, a warning means for warning the changing to the reference set point by the signal outputted from the retaining means by way of light or sound may be provided. Preferably, a light emitting diode is used as a luminous element and an electronic buzzer as a sound element.

DETAILED DESCRIPTION OF THE PREFERRED EMBODIMENTS

A vacuum coffee maker embodying the present invention shown in FIG. 1 through FIG. 3 will be described in detail.

Figure 1:
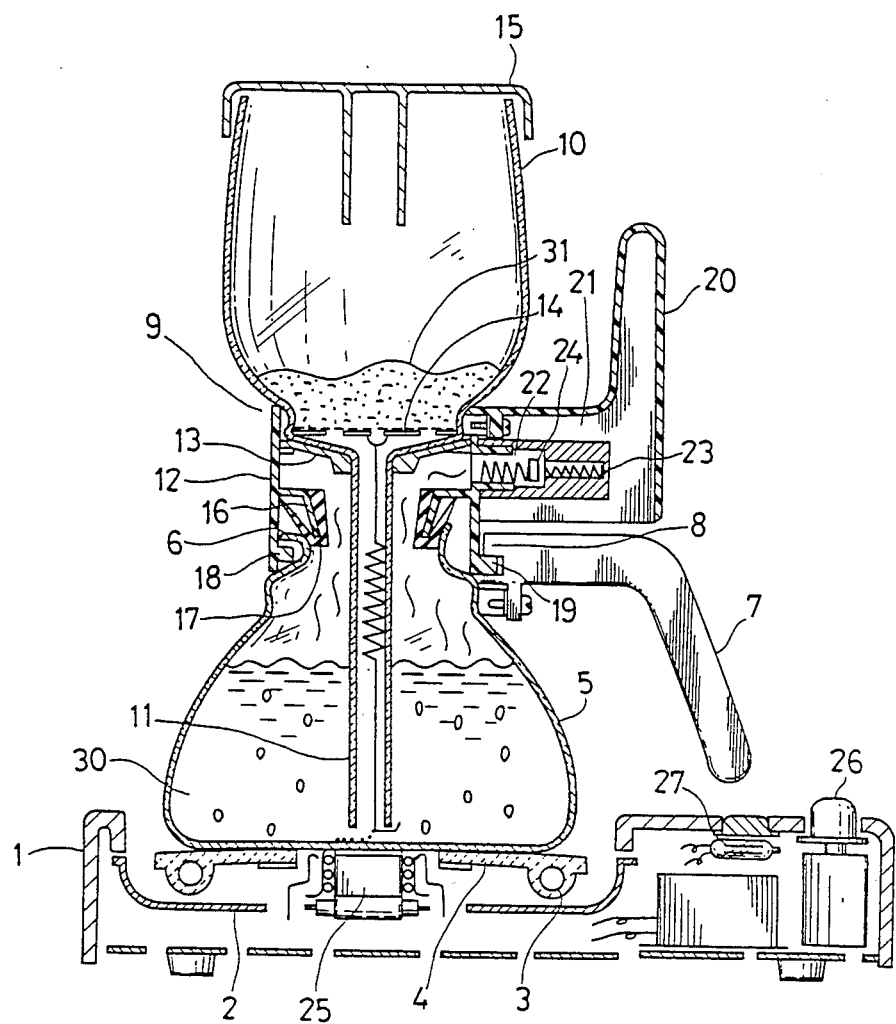
FIG. 1 is a longitudinal sectional view showing the construction of a vacuum coffee maker embodying the heating apparatus of the present invention.

Referring now to FIG. 1, a heating apparatus 1 is fitted inside with a shield 2, and a heating plate 4 in which a heater 3 is integrally incorporated is disposed on the shield 2. A first container (flask) 5 forms a pour opening 6 on an appropriate part of the upper opening as well as providing at the opposite position of the pour opening 6 a handle 7 which is made of synthetic resin. A pair of engagement sockets is provided on the flask 5. A engagement socket is combined with the pour opening 6 of the flask 5 while a second engagement socket 8 is formed at the fixed end of the handle 7.

A second container (funnel) 9 comprises a container (funnel) body 10, which is made of glass and vertically provided with a pipe 11 at the lower part of its bottom, and a container support (annular member) 12 which is made of a synthetic resin and integrally fixed on the outer periphery of the funnel body 10 with a gasket 13 interposed between them. The funnel body 10, whose inner bottom is removably fitted with a filter 14, receives coffee powder in the filter 14, and its upper opening can be closed by means of a cover 15. The funnel support 12 integrally forms a cylinder 16 which is located at an adequate space on the outer periphery of a pipe 11 located inside the first container, and the cylinder 16 is fitted with a gasket 17. Also, the funnel support 12 integrally forms at the lower end, an engagement projection 18, which is a first convex portion and faces inside, and an engagement projection 19 which is a second convex portion and faces outside, thereby constituting an engagement support means with each of the engagement sockets and engagement projections.

As shown in FIG. 1, by turning funnel in the a press-fitting wax and compressing the gasket 17 against the opening of the flask 5, the funnel 9 engages an engagement projection 18 beneath the pour opening 6 and an engagement projection 19 with an engagement socket 8, so that each engagement can be retained by the elasticity of the gasket 17, thereby the juncture between the flask 5 and funnel 9 can be securely sealed.

The funnel support 12 described above integrally forms a handle 20 at a position where it faces the handle 7 on the flask 5 and provides a pressure control valve 21 at a position which is covered by the handle 20. The pressure control valve 21 comprising shape-memory alloy 22, spring 23, and valve body 24, opens the inside of the flask 5 to expose itself to the air in the open state during normal temperature operations, and then closes when an ambient temperature inside the flask 5 reaches a specified temperature.

In FIG. 1, reference numeral 25 denotes a heat sensing device used for sensing temperatures at the bottom of the flask 5, reference numeral 26 a main switch, and reference numeral 27 a power indication lamp.

Figure 2:
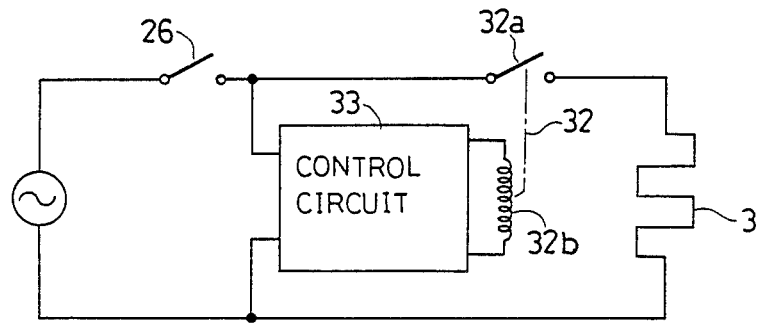
FIG. 2 is an electric circuit diagram of the embodiment of the heating apparatus of the present invention.

Referring now to the electric circuit of the heating apparatus 1 as shown in FIG. 2, a relay 32 forms part of an energizing control means and comprises a relay switch 32a and a relay coil 32b. The relay switch 32a is serially connected to the main switch 26 and the heater 3. The relay coil 32b of the relay 32 is connected to a temperature control circuit 33 particularly shown in FIG. 3.

Figure 3:
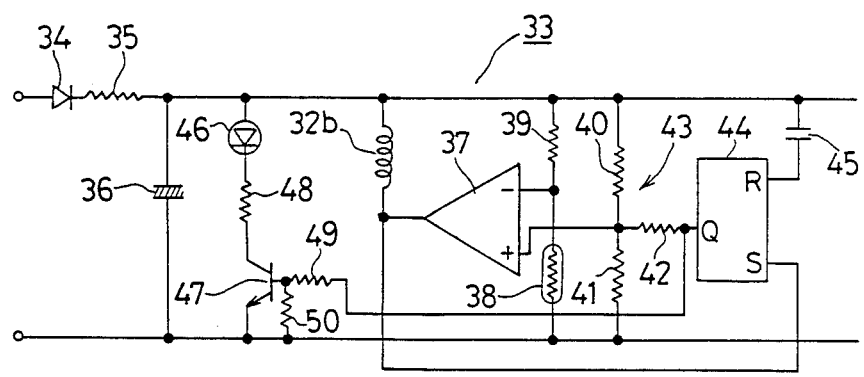
FIG. 3 is an electric circuit diagram of a control circuit of the embodiment.

In FIG. 3, reference numeral 34 indicates a diode, reference numeral 35 shows a resistor and reference numeral 36 denotes a capacitor, whereby AC is rectified and smoothed to obtain DC. Reference numeral 37 represents a comparison circuit comprising a one-chip IC, in which the relay coil 34b is serially connected to its output terminal and its minus input terminal a thermistor 38 which is used as a temperature detecting means for detecting the temperature of a subject being heated as well as the resistor 39 are connected to the minus input terminal. Thereby, a voltage value divided by the thermistor 38 and the resistor 39 is inputted into the minus input terminal of the comparison circuit 37. To the plus input terminal of the comparison circuit 37, a reference set point generating circuit 43 comprising resistors 40, 41 and 42 is connected. One end of the resistor 42 of the reference set point generating circuit 43 is connected to the output terminal Q of a retaining circuit 44 comprising an R.S flip-flop.

When the output terminal Q of the retaining circuit 44 is at logical low, the resistors 41 and 42 are connected in parallel so as to apply a "low" level voltage (a high set point in terms of temperature) to the plus input terminal of the comparison circuit 37, and when the output terminal Q of the retaining circuit 44 is at logical high, the resistors 40 and 42 are connected in parallel so as to apply a "high" level voltage (a low set point in temperature-wise) to the plus input terminal of the comparison circuit 37.

Also, to the R terminal which is the reset input terminal of the retaining circuit 44, a capacitor 45 is connected, and to the S terminal which is the set input terminal, the output terminal in the comparison circuit 37 is connected. Furthermore, to the output terminal Q of the retaining circuit 44, the base of a switching transistor 47 for switching on and off a light emitting diode (LED) 46 constituting a warning means is connected. Reference numerals 48, 49 and 50 indicate the resistors. Meanwhile, the thermistor 38 is provided in the heat sensing device 25.

Operation of the heating apparatus 1 will be described in the following together with the operating method of the vacuum coffee maker.

The funnel 9 containing a coffee powder 31 is coupled with the flask 5 containing water 30, then the main switch 26 is switched on after placing the flask 5 on the heating plate 4. Through the capacitor 45, the input signal is applied to the R terminal in the retaining circuit 44 by the power build-up causing the Q terminal to be maintained a logical low. Thus, the resistors 41 and 42 being connected in parallel causes voltage of the plus input of the comparison circuit 37 at this time to become the first set temperature level (high set point). At this time, since the resistance value of the thermistor 38 is high due to a low temperature of the subject being heated, the output of the comparison circuit 37 becomes logical low, energizing the relay coil 32b of the relay 32, The relay switch 32a is switched on, and the heater 3 is energized to heat the water in the flask 5. The water temperature starts to rise and eventually generates steam.

At this time, however, the pressure control valve 21 of the flask 5 is in the opened state so as to cause the inside of the flask 5 to be in communication with the air, and therefore the pressure in the flask 5 does not rise immediately. Then, the temperature of the hot water in the flask 5 increase close to the boiling point so that stream is extensively generated. Then the ambient temperature in the flask 5 has reached a predetermined value, the pressure control valve 21 is closed. If the pressure control valve 21 is closed, the inside of the flask 5 becomes airtight, and the inside pressure increases rapidly so as to push the boiling water up through and into the funnel and the filter 14, thereby making the boiling water come in contact with the coffee powder 31. Thus, taste and aroma of the coffee powder 31 are effectively extracted by the boiling water.

When the boiling water volume in the flask 5 decreases and as the water temperature rises, the resistance of thermistor 38 becomes smaller causing the minus input of the comparison circuit 37 to drop below the plus input. The output of comparison circuit 37 becomes logical high causing the relay 32 to open thereby de-energizing the heater 3.

At this time, by inputting the output of the comparison circuit 37 to the S input of the retaining circuit 44, the output Q of the retaining circuit become logical high and continues to be retain in this state. Thus, the resistors 40 and 42 being connected in parallel causes the plus input of the comparison circuit 37 become higher than before (lower than the first set level in temperature-wise).

Also, since the output terminal Q of the retaining circuit 44 is kept at the logical high regardless of the subsequent input of logical low or logical high to the S input, the relay 32 is switched on and off at the second set level (low temperature set point) thereafter to effect warming.

Moreover, in FIG. 3, when the output of the output terminal Q of the retaining circuit 44 is at logical low, the LED 46 is turned off and at logical high, it is turned on.

Thus, the warming mode is indicated by the LED 46 which turns on when entering the warming mode.

When the temperature in the flask 5 starts to drop and the internal pressure of the flask 5 reduces as the time elapse after the stopping of the heater 3, the internal pressure of the flask 5 becomes less with respect to the funnel 9 causing the coffee solution in the funnel 9 to be restored through the filter 14 and pipe 11.

After the extraction of coffee essence, by holding the handles 7, 20 and rotating the flask 5 and the funnel 9 reciprocally to disengage the engagement projections 18, 19 from the pour opening 6 and the engagement socket 8, the funnel 9 can be pulled off from the flask 5, enabling the coffee solution to be poured into a coffee cup. Meanwhile, the coffee remaining in the flask 5 may be kept at, for example, 80° to 85° C. if the flask 5 is placed on the heating plate 4, since, as previously described, the heater 3 is energized at the second set level.

In the foregoing embodiment, though the vacuum coffee maker has been described, it is to be understood that it can be used similarly in an electric pot.

Since the present invention is construction in such a manner, one comparison circuit enables the setting of both the high temperature heating mode and the low temperature heating mode, thus the structure of temperature control circuit may be considerably simplified resulting in a low manufacturing cost. Besides, the stable operation being achieved by deleting the mechanical actuating parts, the apparatus can be repaired by replacing either or both of the one-chip IC of the comparison circuit and R.S flip-flop in the case of failure making the repairing service extremely easy.

What is claimed is:

1. A heating apparatus, comprising:
   a heating member for heating a subject to be heated;
   temperature detecting means for detecting a temperature of said subject and generating an output signal corresponding to the detected temperature;
   reference set point generating means for changing and outputting a plurality of preset reference set signals
   comparison means, operatively connected to said temperature detecting means and said reference set point generating means, for comparing said output signal of said temperature detecting means and a present preset reference set signal and generating a comparison signal representing the comparison result;
   energizing control means, responsive to said comparison means, for controlling a supply of electricity to said heating member in accordance with said comparison signal from said comparison means; and
   retaining means, operatively connected to said comparison means, for holding said comparison signal from said comparison means and outputting a change signal to said reference set point generating means;
   said reference set point generating means changing said present preset reference set signal once to a new preset reference set signal in response to said change signal, thereby causing said heating member to heat at a new temperature.

2. The heating apparatus as claimed in claim 1, wherein said retaining means is an R-S flip-flop circuit.

3. The heating apparatus as claimed in claim 1, wherein said temperature detecting means is a thermister.

4. The heating apparatus as claimed in claim 1, further comprises:
   warning means for warning that said present preset reference set signal has been changed to said new preset reference set signal by.

5. The heating apparatus as claimed in claim 4, wherein said warning means comprises a light emitting diode and a driving circuit.

6. A heating apparatus which uses a heating element to heat a liquid in a vacuum coffee maker, comprising:
   sensing means for determining a temperature of said liquid and generating a temperature signal representing the determined temperature;
   reference generating means for outputting a first reference signal representing a first temperature level;
   comparing means, operatively connected to said sensing means and said reference generating means, for generating a comparison signal representing a comparison between said temperature signal and said first reference signal; and
   energizing means, responsive to said comparing means, for causing said heating element to operate in accordance with said comparison signal;
   said reference generating means, in response to said comparison signal, outputting a second reference signal representing a second temperature level, said second reference signal being maintained by said reference generating means until an interruption of power to the heating apparatus.

7. The heating apparatus as claimed in claim 6, wherein said reference generating means comprises:
   retaining means for maintaining the outputting of said second reference signal.

8. The heating apparatus as claimed in claim 6, wherein said energizing means comprises a relay.

9. The heating apparatus as claimed in claim 6, wherein said sensing means comprises a thermistor.

10. A method for heating a substance by using a heating apparatus having a heating element, comprising the steps of:
    (a) sensing a temperature of the substance being heated;
    (b) generating a temperature signal representing the sensed temperature of said step (a);
    (c) generating a first level reference signal representing a first temperature level;
    (d) comparing the temperature signal of said step (b) with the first level reference signal of said step (c);
    (e) generating a comparison signal representing the comparison of said step (d);
    (f) energizing the heating element in accordance with the comparison signal;
    (g) generating a second level reference signal representing a second temperature level in accordance with the comparison signal;
    (h) repeating said steps (d), (e), and (f), except using the second level reference signal in said step (d) instead of using the first level reference signal; and
    (i) maintaining the second level reference signal until an interruption of power to the heating apparatus.

11. The method as claimed in claim 10, wherein said step (g) generates the second level reference signal such that the second level reference signal is at a higher voltage level than the first level reference signal.

* * * * *